Sept. 4, 1951 A. M. YOUNG 2,566,916
SIDE-BY-SIDE COFFEE MAKER
Filed Dec. 24, 1948
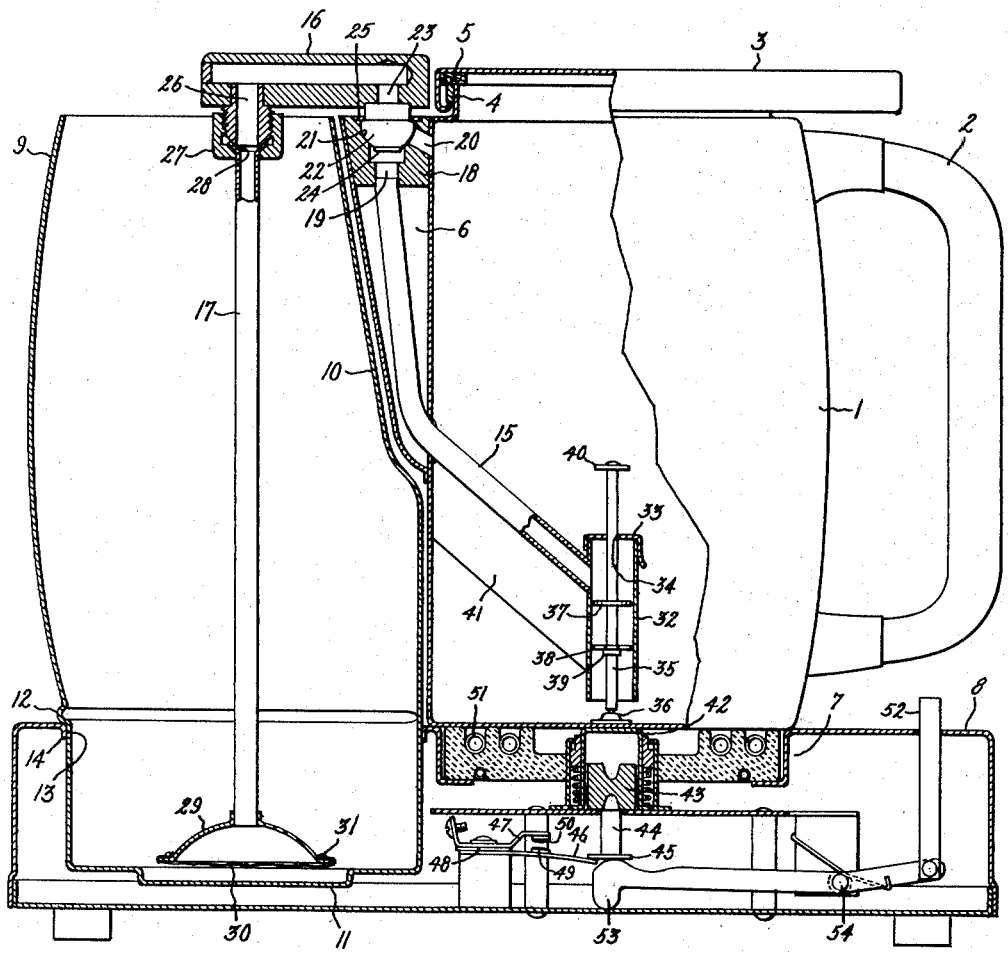
Inventor:
Allan M. Young,
by Sheridan LeBriggs
His Attorney.

Patented Sept. 4, 1951

2,566,916

UNITED STATES PATENT OFFICE 2,566,916

SIDE-BY-SIDE COFFEE MAKER

Allan M. Young, Meriden, Conn., assignor to General Electric Company, a corporation of New York Application December 24, 1948, Serial No. 67,137

2 Claims. (Cl. 99—292)

1

My invention relates to coffee makers and more particularly to a vacuum type side by side coffee maker wherein a water heating receptacle is placed alongside a cooperating coffee brewing receptacle.

It has for one of its objects the construction of a new and improved coffee maker of the above character.

Another object is to provide a side by side coffee maker in which the coffee making process is completely automatic.

A further object is a provide a coffee maker of the above type which can be used in conjunction with electric stoves or heaters such as described and claimed in U. S. Patent Number 2,287,583 issued to W. R. Weeks on June 23, 1942 and in U. S. Patent 2,445,591 issued to E. C. Sullivan, July 20, 1948.

A further object is to provide a new and improved easily separable fluid tight connection in the liquid transferring means connecting the receptacles of the above type coffee maker.

A still further object is to provide a coffee maker which is compact and easily portable and suitable for household use.

A still further object is to provide a brewing receptacle which has a configuration to permit the return of a greater amount of brewed coffee back into the heating receptacle during the coffee making process.

In general, my invention comprises a fluid tight water heating receptacle removably positioned beside a cooperating coffee brewing receptacle and having liquid transferring means extending from within the water heating receptacle through an easily separable fluid tight connection within its spout to a point adjacent the bottom of the brewing receptacle. A mechanism for automatically reducing the heat applied to the water heating receptacle from an associated heating unit is incorporated into the invention. This mechanism includes an armature located within the water heating receptacle, which, when elevated due to a predetermined amount of vapor and water pressure within the receptacle, magnetically cooperates with a reciprocable member within the heating unit to reduce the heat applied.

The novel features which I believe to be characteristic of my invention are set forth with particularity in the appended claims. My invention itself, however, together with further objects and advantages may best be understood by reference to the following description taken in connection with the accompanying drawing in which the

2 single figure is a vertical view partly in section of one embodiment of my invention.

Referring to the drawing, I have shown my invention in one form as comprising a water heating receptacle 1 having a handle 2 and a cover 3 which may be sealed to the receptacle 1 by virtue of a locking lug 4 and an annular sealing gasket 5. Water heating receptacle 1 has a spout 6 preferably of a conventional laterally projecting tapered configuration and rests on a stove 7 preferably of the type described and claimed in the above-mentioned patents. Stove 7 is enclosed within a base 8.

A coffee brewing receptacle 9, open at the top, is removably positioned beside heating receptacle 1 on base 8. An indentation 10 is formed in a wall of brewing receptacle 9 to match the projecting configuration of spout 6 and to permit brewing receptacle 9 to be positioned contiguous to the heating receptacle 1. The bottom of brewing receptacle 9 has a recessed portion 11 to permit more complete extraction of coffee from the brewing receptacle during the coffee making process.

In order to position securely brewing receptacle 9, despite the uneven configuration of its bottom surface, I provide an annular flange or lip 12 formed around the wall of receptacle 9 and spaced a short distance from the bottom thereof. When receptacle 9 is inserted within an aperture 13 formed in base 8, the flange 12 rests on the rim 14 of aperture 13 and functions to support receptacle 9 thereon.

In order to accomplish the transfer of liquid between heating receptacle 1 and brewing receptacle 9, I provide, in one embodiment of my invention, a number of separably connected hollow members comprising a transfer tube 15 extending from within heating receptacle 1 to the mouth of spout 6, a substantially horizontal interconnecting hollow member 16 extending from the mouth of spout 6 over the open top of brewing receptacle 9 and a second transfer tube 17 extending from the top of brewing receptacle 9 down to a point adjacent the bottom thereof.

Within the mouth of spout 6, I provide a new and improved device for making an easily separable fluid tight connection between the liquid transfer tube 15 and the interconnecting member 16. A sealing member such as socket 18 having a number of axially extending telescoped cylindrical apertures 19 is welded or otherwise suitably sealed to the walls within spout 6. Although transfer tube 15 may be terminated anywhere within spout 6, I prefer to extend and seal transfer tube 15 into the bottom end of socket 18. An angular aperture 20 formed in socket 18 leads from the interior of receptacle 1 to the mouth of spout 6. Aperture 20, together with the upper end 21 of socket 18, function as a pouring outlet for liquid within water heating receptacle 1. A bulb-shaped resilient sealing stopper or plug 22, preferably of rubber composition, tightly encircles a small tube 23 which extends downward from within interconnecting member 16. Plug 22 rests on a flared lower end 24 of tube 23. The lower portion of plug 22 is semispherical in shape and tapers upwardly into a narrow neck. The upper end 21 of socket 18 is suitably formed to receive the lower portion of plug 22 and has a ring 25, preferably metallic, welded or otherwise suitably embedded within its top surface. Ring 25 has an inner diameter equal to the neck of plug 22. In order to insert plug 22 within socket 18 and thereby make a fluid tight connection between transfer tube section 15 and interconnecting member 16, plug 22 must be forced past ring 25. Once within socket 18, the body of plug 22 is rigidly secured in place under ring 25.

When plug 22 is inserted within socket 18, the interconnecting member 16 is held in a substantially horizontal position extending over the top of brewing receptacle 9. A hollow downwardly projecting leg 26 is secured to the extension end of interconnecting member 16 and provides a point of connection to transfer tube section 17. A knurled nut 27 encircling the upper flared end 28 of tube 17 is threaded to the lower end of leg 26 and serves to make this fluid tight connection.

On the bottom end of tube section 17 just above recessed portion 11 of brewing receptacle 9, I provide means for filtering coffee which, preferably, comprises a bell-shaped filter holder 29 on which a filter cloth 30 is mounted and drawn tight by means of a draw string 31.

In order to cause the coffee making process to be completely automatic, means are provided for automatically reducing the heat applied to heating receptacle 1 at a predetermined point during the coffee infusion period. Such means preferably are constructed and arranged as described and claimed in the afore-mentioned patents issued to W. R. Weeks and E. C. Sullivan; and comprise a tubular member 32 secured to and opening into the lower end of tube section 15 and extending to a point adjacent the bottom of heating receptacle 1. A cup-shaped end cap 33 covers the upper end of tubular member 32 and preferably is composed of a resilient metal which adheres as a spring fit to the walls of tubular member 32 without the necessity of further holding means. End cap 33 has a centrally positioned hole 34 which serves as a guide for a rod 35 slidably inserted along the longitudinal axis of tubular member 32. On the lower end of rod 35 external to tubular member 32, an armature 36, preferably metal and having a diameter slightly smaller than the inner diameter of tubular member 32, is secured. Armature 36 normally rests on the bottom of heating receptacle 1. A perforate disk 37 also having a diameter almost equal to the inner diameter of tubular member 32 is secured therein to rod 35. Spaced a short distance below disk 37 is an imperforate washer 38 having a loose fitting central hole and resting on an annular shoulder 39 secured to rod 35. Another washer 40 is secured to the top of rod 35 external to tubular member 32 and serves as a knob or handle by which the rod assembly may be removed from within tubular member 32. A supporting fin 41 extends from the wall of receptacle 1 to tubular member 32 to rigidly secure the rod assembly in its proper position.

Directly beneath armature 36 within stove 7 is a cylinder 42 containing a vertically reciprocable magnetic member such as piston 43 preferably of the sintered aluminum-nickel-cobalt type. Piston 43 is secured to a downwardly extending plunger 44 having an annular shoulder 45 at its lower end. When magnetic piston 43 is at the bottom of cylinder 42, as illustrated in Fig. 1, the annular shoulder 45 of plunger 44 holds a switching arm 46 away from a rigid arm 47 of a switch 48 and functions to open a pair of contacts 49 and 50. Switch 48 is connected (connections not shown) to a main heating element 51 encircling cylinder 42. When piston 43 is adjacent the top of cylinder 42, plunger 44 permits contacts 49 and 50 to engage, thereby energizing heating element 51. An actuating lever 52 having one end 53 directly beneath plunger 44 is fulcrumed on a pin 54. When lever 52 is depressed, the end 53 forces piston 43 to the top of cylinder 42.

In its raised position, piston 43 hangs on armature 46 because of its magnetic attraction thereto. If armature 36 is elevated, the magnetic attraction between these two elements is decreased and piston 43 drops to its lower position since it has nothing to which it can magnetically adhere.

In the operation of my invention, ground coffee is placed in the bottom of brewing receptacle 9, water to the amount of coffee desired is poured into water heating receptacle 1, and cover 3 is closed and clamped. The brewing receptacle 9 is positioned on base 8 by inserting its lower portion within aperture 13 thereof. The water heating receptacle 1 is positioned on stove 7 adjacent brewing receptacle 9 so that spout 6 fits within the indentation 10 formed in the wall of brewing receptacle 9. Transfer tube 17 and interconnecting member 16 are connected to the water heating receptacle 1 by forcing plug 22 into socket 18 in the mouth of spout 6. In order to energize stove 7, actuating lever 52 is depressed forcing piston 43 to its raised position. The annular shoulder 45 of plunger 44 thereupon releases switching arm 46, closing contacts 49 and 50 and energizing heating element 51.

As the temperature of the water within heating receptacle 1 increases, vapor pressure is generated within the heating receptacle until the heated water is forced up through tubular member 32, transfer tube 15, connecting member 16, and transfer tube 17 into brewing receptacle 9 where it mixes with the ground coffee placed therein previously. In passing through tubular member 32, the heated water flows around the sides of imperforate washer 38 and through the perforations of disk 37. When the rush of water within tubular member 32 reaches sufficient volume, loosely fitting imperforate washer 38 is carried up rod 35 until it closes the perforations of disk 37. Thereupon, the vapor pressure within heating receptacle 1 continues to increase until the velocity of the water within tubular member 32 is sufficient to elevate the entire rod and armature assembly. When this happens, piston 43 no longer has anything to which it can magnetically adhere, and it drops to its lower position opening switch 48 and deenergizing the main heating element 51.

As heating receptacle 1 cools, the vapor within it condenses and a partial vacuum is created which draws the brewed coffee within brewing receptacle 9 back through filter 30, liquid transfer tube 17, interconnecting member 16, transfer tube 15 and tubular member 32 into the heating receptacle 1. Because of the recessed portion 11 in the bottom of brewing receptacle 9, ground coffee may be confined within this recessed portion, and the filter holder 29 can be extended very close to the level of the bottom surface without interfering with the flow of liquid. As a result, only a very small amount of brewed coffee is left within the brewing receptacle 9 after the vacuum is created within heating receptacle 1 and the coffee is drawn back thereinto.

When it is desired to serve the coffee, interconnecting member 16 is grasped and plug 21 is pulled out of its socket connection. In pouring, the coffee flows out through aperture 20 in socket 18 and also through tubular member 32 and transfer tube 15.

Transfer tube section 17 may be removed from its connection to interconnecting member 16 by simply unscrewing knurl nut 27. The rod and armature assembly may be removed from tubular member 32 for cleaning purposes by simply grasping knob 40 and elevating rod 35 upward until end cap 33 is pulled away from tubular member 32.

Although I have shown my invention preferably as being constructed to be completely automatic and to be used in conjunction with an electric stove such as described and claimed in the aforementioned patents, it is to be understood that my invention is also operable without the incorporation of these automatic features. Tubular member 32 together with its inserted rod and armature assembly may be omitted and the resultant coffee maker can be heated and controlled by conventional means.

It is also to be understood that while I have shown a particular embodiment of my invention, I do not wish to be limited thereto since many modifications may be made and, I therefore, contemplate, by the appended claims, to cover all such modifications as fall within the true spirit and scope of my invention.

What I claim as new and desire to secure by Letters Patent of the United States is:

1. In a coffee maker, a coffee brewing receptacle, a water heating receptacle having a sealable cover and removably positioned beside said brewing receptacle, said heating receptacle having a spout and liquid transferring means communicating from said spout to a point adjacent the bottom of said heating receptacle, a tube having one end extending into said brewing receptacle and its other end separably connected in a fluid tight manner within said spout, said separable connection comprising a bulb-shaped resilient plug tightly encircling said other end of said tube and a hollow cylindrical sealing member secured to the inner wall of said spout and having a socket adapted to receive said plug, said socket having a ring embedded in its upper surface under which said plug is retained.

2. In a coffee maker, a base having a circular aperture in the top thereof, an electric stove located within said base, a fluid tight water heating receptacle having a spout and positionable on said base above said stove, a coffee brewing receptacle having a projecting flange formed around the wall adjacent the bottom thereof and having a lower portion adapted to be inserted within said circular aperture, said brewing receptacle being supported by said flange resting on said base on the rim of said aperture, and liquid transferring means comprising a plurality of hollow members separably connected in a fluid tight manner and extending from within said heating receptacle through said spout into said brewing receptacle, one of said separable connections being located within said spout and comprising a bulb-shaped resilient plug secured around one end of one of said hollow members and a cylindrical sealing member secured to the inner wall of said spout and having a socket adapted to receive said plug, said socket having an annular ring secured to its upper surface under which said plug is retained.

ALLAN M. YOUNG.

REFERENCES CITED

The following references are of record in the file of this patent:

UNITED STATES PATENTS

| Number | Name | Date |
|---|---|---|
| 55,509 | Liesche | June 12, 1866 |
| 109,901 | Hildenbrand | Dec. 6, 1870 |
| 368,232 | Perdelwitz | Aug. 16, 1887 |
| 449,603 | Thrall | Mar. 31, 1891 |
| 1,952,733 | Smith | Mar. 27, 1934 |
| 2,097,681 | Wolcott | Nov. 2, 1937 |
| 2,139,881 | Comstock | Dec. 13, 1938 |
| 2,269,111 | Jepsen et al. | Jan. 6, 1942 |
| 2,287,580 | Wagner | June 23, 1942 |